United States Patent
Hou

(10) Patent No.: US 10,113,684 B2
(45) Date of Patent: Oct. 30, 2018

(54) BRACKET FOR NOTEBOOK COMPUTER OR TABLET COMPUTER

(71) Applicant: Shenzhen Xgear Technology Co., Ltd., Shenzhen, Guangdong (CN)

(72) Inventor: Yan Hou, Hunan (CN)

(73) Assignee: SHENZHEN XGEAR TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 15/853,864

(22) Filed: Dec. 25, 2017

(65) Prior Publication Data
US 2018/0252353 A1 Sep. 6, 2018

(30) Foreign Application Priority Data
Mar. 3, 2017 (CN) .................... 2017 2 0205851 U

(51) Int. Cl.
| | |
|---|---|
| F16M 11/00 | (2006.01) |
| F16M 11/10 | (2006.01) |
| F16M 13/00 | (2006.01) |
| G06F 1/16 | (2006.01) |
| A47B 23/04 | (2006.01) |

(52) U.S. Cl.
CPC ............ *F16M 11/10* (2013.01); *F16M 13/00* (2013.01); *G06F 1/1632* (2013.01); *A47B 23/043* (2013.01); *A47B 2023/049* (2013.01)

(58) Field of Classification Search
CPC ....... A47B 23/04; F16M 11/10; F16M 11/041
See application file for complete search history.

(56) References Cited

U.S. PATENT DOCUMENTS

| | | | |
|---|---|---|---|
| 9,625,081 B2 * | 4/2017 | Olander | ................. F16M 11/10 |
| 9,894,988 B2 * | 2/2018 | Olander | ................. A47B 23/04 |

* cited by examiner

*Primary Examiner* — Amy J. Sterling

(57) ABSTRACT

A bracket for a notebook or a tablet computer, includes a first, second, third, fourth, fifth, sixth support rods, a first, second stopper clips, a first, second synchronization rods. A front end of the first support rod is rotatably connected to the third support rod. A front end of the second support rod is rotatably connected to the fourth support rod. The third support rod is rotatably connected to the fifth support rod. The fourth support rod is rotatably connected to the sixth support rod. One end of the fifth support rod is rotatably connected to a first groove, and the other end is rotatably connected to a guide rail. One end of the sixth support rod is rotatably connected to a second groove, and the other end is rotatably connected to another guide rail. The bracket is convenient for retracting and placing, provides good stability and convenient for carrying.

20 Claims, 1 Drawing Sheet

BRACKET FOR NOTEBOOK COMPUTER OR TABLET COMPUTER

CROSS REFERENCE TO RELATED APPLICATIONS

The present application claims the benefit of Chinese Patent Application No. 201720205851.9 filed on Mar. 3, 2017. The above is hereby incorporated by reference.

FIELD

The subject matter herein generally relates to a bracket for a mobile terminal.

BACKGROUND

A mobile terminal bracket is used to support a mobile terminal (such as a notebook computer or a tablet computer) when a user uses the mobile terminal.

SUMMARY

The present disclosure aims to overcome the shortcomings of the present notebook computer table or tablet computer table and provides a novel notebook computer or tablet computer bracket. The present disclosure provides a bracket for a notebook computer or a tablet computer, which can easily adjust the setting height and angle of the notebook computer or tablet computer and is convenient to carry.

The purpose of the present disclosure is realized through the following technology:

A bracket for a notebook computer or a tablet computer comprises a first support rod, a second support rod, a third support rod, and a fourth support rod. The first support rod comprises a guide rail. The second support rod comprises another guide rail. The third support rod defines a first groove. The fourth support rod defines a second groove. A front end of the first support rod is rotatably connected to the third support rod. A front end of the second support rod is rotatably connected to the fourth support rod. The third support rod is rotatably connected to a fifth support rod. One end of the fifth support rod is rotatably connected to the first groove of the third support rod, and the other end of the fifth support rod is rotatably connected to the guide rail of the first support rod. The fourth support rod is rotatably connected to a sixth support rod. One end of the sixth support rod is rotatably connected to the second groove of the fourth support rod, and the other end of the sixth support rod is rotatably connected to the guide rail of the second support rod. A first stopper clip is defined on the first support rod, or on the third support rod, or on a connecting shaft between the first support rod and the third support rod. A second stopper clip is defined on the second support rod, or on the fourth support rod, or on a connecting shaft between the second support rod and the fourth support rod. A first synchronization rod is connected between the first support rod and the second support rod. A second synchronization rod is connected between the first support rod and the second support rod. Two ends of the first synchronization rod are rotatably connected to the first support rod and the second support rod, respectively. Two ends of the second synchronization rod are rotatably connected to the first support rod and the second support rod, respectively. The first synchronization rod and the second synchronization rod are rotatably coupled to each other, the intersection between the first synchronization rod and the second synchronization rod is in the middle of the first synchronization rod and is also in the middle of the second synchronization rod.

Another technology scheme of the present disclosure is illustrated as follows:

A bracket for a notebook computer or a tablet computer comprises a first support rod, a second support rod, a third support rod, and a fourth support rod. The first support rod comprises a first groove. The second support rod comprises a second groove. The third support rod defines a guide rail. The fourth support rod defines another guide rail. A front end of the first support rod is rotatably connected to the third support rod. A front end of the second support rod is rotatably connected to the fourth support rod. The third support rod is rotatably connected to a fifth support rod. One end of the fifth support rod is rotatably connected to the guide rail of the third support rod, and the other end of the fifth support rod is rotatably connected to the first groove of the first support rod. The fourth support rod is rotatably connected to a sixth support rod. One end of the sixth support rod is rotatably connected to the guide rail of the fourth support rod, and the other end of the sixth support rod is rotatably connected to the second groove of the second support rod. A first stopper clip is defined on the first support rod, or on the third support rod, or on a connecting shaft between the first support rod and the third support rod. A second stopper clip is defined on the second support rod, or on the fourth support rod, or on a connecting shaft between the second support rod and the fourth support rod. A first synchronization rod is connected between the first support rod and the second support rod. A second synchronization rod is connected between the first support rod and the second support rod. Two ends of the first synchronization rod are rotatably connected to the first support rod and the second support rod, respectively. Two ends of the second synchronization rod are rotatably connected to the first support rod and the second support rod, respectively. The first synchronization rod and the second synchronization rod are rotatably coupled to each other, the intersection between the first synchronization rod and the second synchronization rod is in the middle of the first synchronization rod and is also in the middle of the second synchronization rod.

Thus, the first synchronization rod and the second synchronization rod can keep the synchronism of the first, second, third, fourth, fifth, and sixth support rods, during a process of opening the bracket or closing the bracket, thereby enabling the bracket to be conveniently rotated to be open or closed. Each of the first stopper clip and the second stopper clip which is defined on the support rods or on the connecting shaft, is used to prevent the notebook computer (or the tablet computer) from slipping and increase the stability of the notebook computer (or the tablet computer).

An anti-slip layer is defined on a surface of the first support rod or a surface of the second support rod. The anti-skid layer on the surface of the first, or second support rod can increase the friction between the notebook computer (or the tablet computer) and the support rods, increase the stability of the notebook computer (or the tablet computer), and prevent the notebook computer (or the tablet computer) damages and from falling.

Preferably, a third synchronization rod is connected between the third synchronization rod and the fourth synchronization rod, two ends of the third synchronization rod are rotatably connected to the third support rod and the fourth support rod, respectively.

Preferably, a fourth synchronization rod is connected between the third synchronization rod and the fourth synchronization rod, two ends of the fourth synchronization rod are rotatably connected to the third support rod and the fourth support rod, respectively.

Preferably, the third synchronization rod and the fourth synchronization rod are also rotatably coupled to each other, the intersection between the third synchronization rod and the fourth synchronization rod is in the middle of the third synchronization rod and is also in the middle of the fourth synchronization rod. Thus, two pairs of synchronization rods (the first, second, third, and fourth synchronization rods) are arranged on the bracket to increase the stability when the bracket is used to support the notebook computer or the tablet computer.

Preferably, a first alterable included angle is defined between the first support rod and the third support rod, the first alterable included angle is less than or equal to 90 degrees.

Preferably, a second alterable included angle is defined between the second support rod and the fourth support rod, and the second alterable included angle is less than or equal to 90 degrees.

Preferably, the first synchronization rod intersects the second synchronization rod to form X-shaped.

Each of the first alterable included angle and the second alterable included angle is less than or equal to 90 degrees, the notebook computer or the tablet computer can be easily placed to prevent from dropping.

Preferably, each of the first stopper clip and the second stopper clip is 6-shaped. Each of the 6-shaped first stopper clip and the 6-shaped second stopper clip is 6-shaped 6 is rotatably connected to the support rods or the connecting shaft of the support rods. A coil portion of the 6-shaped first and second stopper clips fits perfectly on the connecting shaft. A projecting portion of the 6-shaped first and second stopper clips turns down to form two stop slides to prevent the notebook computer (or the tablet computer) from slipping.

Preferably, each of the first stopper clip and the second stopper clip is a collapsible stopper clip. Each of the first collapsible stopper clip and the second collapsible stopper clip can be put away when a user does not use them, and can be opened when the user needs to use them.

BRIEF DESCRIPTION OF THE DRAWINGS

Implementations of the present technology will now be described, by way of example only, with reference to the figures.

DETAILED DESCRIPTION

Figure 1:
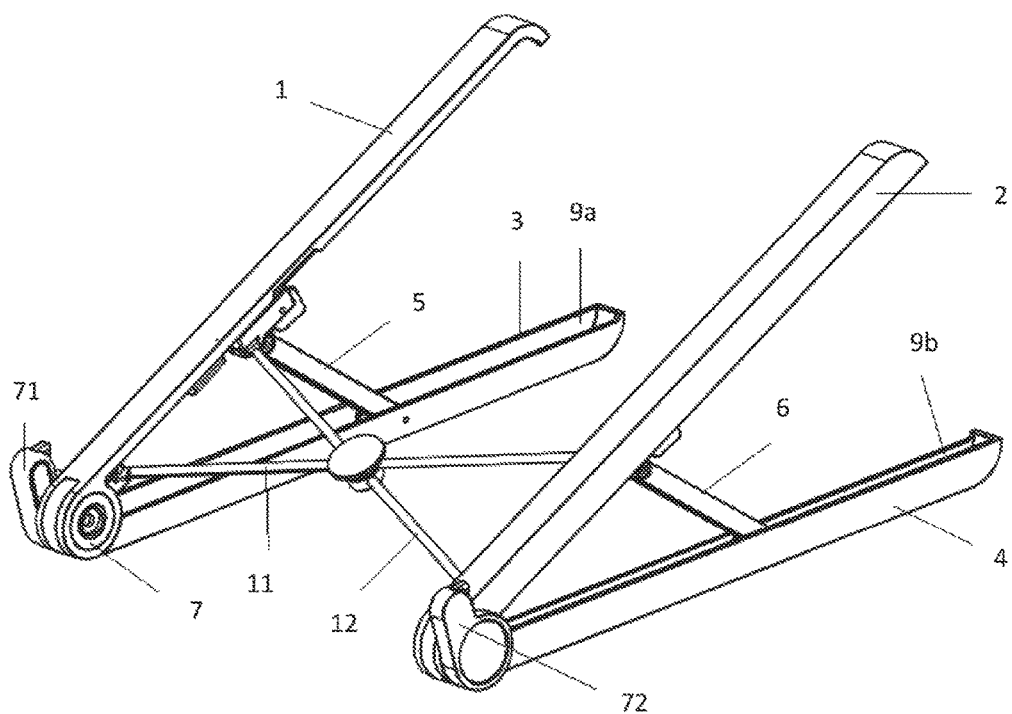
FIG. 1 is an isometric, assembled, view of a first exemplary embodiment of a bracket for a notebook computer or a tablet computer.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiment described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising," when utilized, means "including, but not necessarily limited to"; it specifically indicates open-ended inclusion or membership in the so-described combination, group, series and the like.

The present disclosure described in relation to a bracket for a notebook computer or a tablet computer, and the bracket is used to support the notebook computer or the tablet computer.

Figure 2:
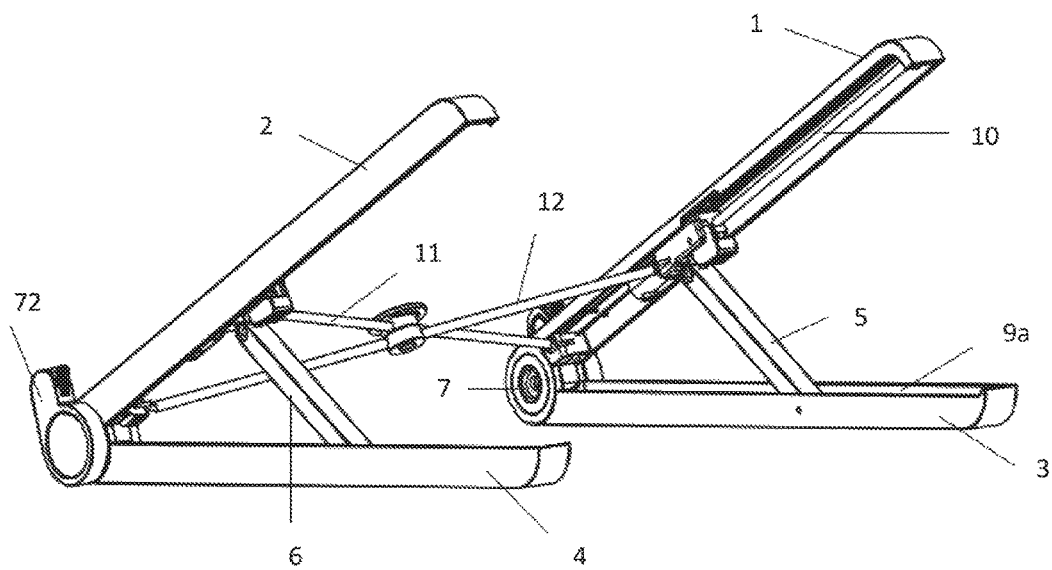
FIG. 2 is another isometric, assembled, view of the first exemplary embodiment of the bracket for a notebook computer or a tablet computer.

FIGS. 1 and 2 illustrate a first embodiment of a bracket for a notebook computer or a tablet computer. The bracket comprises a first support rod 1, a second support rod 2, a third support rod 3, and a fourth support rod 4. The first support rod 1 rotates relative to the third support rod 3. A front end of the first support rod 1 is rotatably connected to the third support rod 3. The second support rod 2 rotates relative to the fourth support rod 4. A front end of the second support rod 2 is rotatably connected to the fourth support rod 4. The first support rod 1 comprises a guide rail 10. The second support rod 2 also comprises another guide rail 10. The third support rod 3 defines a first groove 9a. The fourth support rod 4 defines a second groove 9b. The bracket can be rotated and be opened to be an opening position or be closed to be a closing position.

A first alterable included angle is defined between the first support rod 1 and the third support rod 3. In at least one embodiment, the first alterable included angle is less than or equal to 90 degrees.

A second alterable included angle is defined between the second support rod 2 and the fourth support rod 4. In at least one embodiment, the second alterable included angle is less than or equal to 90 degrees.

Each of the first alterable included angle and the second alterable included angle is less than or equal to 90 degrees, thus the notebook computer or the tablet computer can be easily placed to prevent the notebook computer (or the tablet computer) from dropping.

The third support rod 3 is rotatably connected to a fifth support rod 5. The fifth support rod 5 is located between the first support rod 1 and the third support rod 3. One end of the fifth support rod 5 is rotatably connected to the first groove 9a of the third support rod 3, and the other end of the fifth support rod 5 is rotatably connected to the guide rail 10 of the first support rod 1. The fourth support rod 4 is rotatably connected to a sixth support rod 6. The sixth support rod 6 is located between the fourth support rod 4 and the second support rod 2. One end of the sixth support rod 6 is rotatably connected to the second groove 9b of the fourth support rod 4, and the other end of the sixth support rod 6 is rotatably connected to the guide rail 10 of the second support rod 2.

A connecting shaft 7 is connected between the first support rod 1 and the third support rod 3. The connecting shaft 7 comprises a first stopper clip 71. Another connecting shaft 7 which is connected between the second support rod 2 and the fourth support rod 4, the connecting shaft 7 comprises a second stopper clip 72. A first synchronization rod 11 is connected between the first support rod 1 and the second support rod 2. A second synchronization rod 12 is also connected between the first support rod 1 and the second support rod 2. The first synchronization rod 11 and the second synchronization rod 12 are rotatably coupled to each other. The first synchronization rod 11 intersects the second synchronization rod 12 to form X-shaped. The intersection between the first synchronization rod 11 and the second synchronization rod 12 is in the middle of the first synchronization rod 11 and is also in the middle of the second synchronization rod 12. Two ends of the first synchronization rod 11 are rotatably connected to the first support rod 1 and the second support rod 2, respectively. Two ends of the second synchronization rod 12 are rotatably connected to the first support rod 1 and the second support rod 2, respectively.

Each of the first stopper clip 71 and the second stopper clip 72 is 6-shaped. Each of the first stopper clip 71 and the second stopper clip 72 is rotatably connected to the connecting shaft 7. Each of the first stopper clip 71 and the second stopper clip 72 comprises a coil portion (not labeled), and each coil portion of the first, second stopper clips 71, 72 fits perfectly on the connecting shaft 7. Each of the first stopper clip 71 and the second stopper clip 72 comprises a projecting portion (not labeled), and each projecting portion of the first, second stopper clips 71, 72 turns down to form two stopping slide pieces (not labeled), the two stopping slide pieces are used to prevent the notebook computer (or the tablet computer) from slipping. The first synchronization rod 11 and the second synchronization rod 12 can keep the synchronism of the first, second, third, fourth, fifth, and sixth support rods 1, 2, 3, 4, 5, and 6, during a process of opening the bracket or closing the bracket, thus the bracket is conveniently rotated to be open or closed.

Preferably, an anti-slip layer (not shown) is defined on a surface of the first support rod 1 or a surface of the second support rod 2. The anti-skid layer on the surface of the support rod can increase the friction between the notebook computer (or the tablet computer) and the support rod, increase the stability of the notebook computer (or the tablet computer), and prevent damage from falling.

Furthermore, a third synchronization rod is connected between the third support rod 3 and the fourth support rod 4. A fourth synchronization rod is connected between the third support rod 3 and the fourth support rod 4. Two ends of the third synchronization rod are rotatably connected to the third support rod 3 and the fourth support rod 4, respectively. Two ends of the fourth synchronization rod are rotatably connected to the third support rod 3 and the fourth support rod 4, respectively. The third synchronization rod and the fourth synchronization rod are also rotatably coupled to each other. The intersection between the third synchronization rod and the fourth synchronization rod is in the middle of the third synchronization rod and is also in the middle of the fourth synchronization rod. Two pairs of synchronization rods (the first, second synchronization rods, 11, 12, and the third, fourth synchronization rods) are arranged on the bracket to increase the stability when the bracket is used to support the notebook computer or the tablet computer.

Preferably, each of the first stopper clip 71 and the second stopper clip 72 is a collapsible stopper clip. Each of the collapsible first stopper clip 71 and the collapsible second stopper clip 72 can be retracted when the bracket is not used and can be opened for easy use when the bracket is used.

Preferably, in a second embodiment, a bracket for a notebook computer or a tablet computer comprises a first support rod, a second support rod, a third support rod, and a fourth support rod. A front end of the first support rod is rotatably connected to the third support rod. A front end of the second support rod is rotatably connected to the fourth support rod. Each of the first support rod and the second support rod defines a groove. Each of the third support rod and the fourth support rod comprises a guide rail. The first support rod is rotatably connected to a fifth support rod. One end of the fifth support rod is rotatably connected to the groove of the first support rod, and the other end of the fifth support rod 5 is rotatably connected to the guide rail of the third support rod. The second support rod is rotatably connected to a sixth support rod 6. One end of the sixth support rod 6 is rotatably connected to the groove of the second support rod, and the other end of the sixth support rod 6 is rotatably connected to the guide rail of the fourth support rod. A first stopper clip is defined on the first support rod, or on the third support rod, or on a connecting shaft between the first support rod and the third support rod. A second stopper clip is defined on the second support rod, or on the fourth support rod, or on a connecting shaft between the second support rod and the fourth support rod. A first synchronization rod is connected between the first support rod and the second support rod. A second synchronization rod is also connected between the first support rod and the second support rod. Two ends of the first synchronization rod are rotatably connected to the first support rod and the second support rod, respectively. Two ends of the second synchronization rod are rotatably connected to the first support rod and the second support rod, respectively. The first synchronization rod and the second synchronization rod are rotatably coupled to each other. The intersection between the first synchronization rod and the second synchronization rod is in the middle of the first synchronization rod and is also in the middle of the second synchronization rod.

The exemplary embodiments shown and described above are only examples. Many details are often found in the art such as the other features of a bracket for a notebook computer or a tablet computer. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, including in matters of shape, size, and arrangement of the parts within the principles of the present disclosure, up to and including the full extent established by the broad general meaning of the terms used in the claims. It will therefore be appreciated that the exemplary embodiments described above may be modified within the scope of the claims.

What is claimed is:

1. A bracket for a notebook computer or a tablet computer, comprising:
   a first support rod comprising a guide rail;
   a second support rod comprising another guide rail;
   a third support rod defining a first groove; and
   a fourth support rod defining a second groove;
   wherein a front end of the first support rod is rotatably connected to the third support rod;
   wherein a front end of the second support rod is rotatably connected to the fourth support rod;
   wherein the third support rod is rotatably connected to a fifth support rod, one end of the fifth support rod is rotatably connected to the first groove of the third support rod, and the other end of the fifth support rod is rotatably connected to the guide rail of the first support rod;

wherein the fourth support rod is rotatably connected to a sixth support rod, one end of the sixth support rod is rotatably connected to the second groove of the fourth support rod, and the other end of the sixth support rod is rotatably connected to the guide rail of the second support rod;

wherein a first stopper clip is defined on the first support rod, or on the third support rod, or on a connecting shaft between the first support rod and the third support rod;

wherein a second stopper clip is defined on the second support rod, or on the fourth support rod, or on a connecting shaft between the second support rod and the fourth support rod;

wherein a first synchronization rod is connected between the first support rod and the second support rod, a second synchronization rod is connected between the first support rod and the second support rod;

wherein two ends of the first synchronization rod are rotatably connected to the first support rod and the second support rod, respectively;

wherein two ends of the second synchronization rod are rotatably connected to the first support rod and the second support rod, respectively; and wherein the first synchronization rod and the second synchronization rod are rotatably coupled to each other, the intersection between the first synchronization rod and the second synchronization rod is in the middle of the first synchronization rod and is also in the middle of the second synchronization rod.

2. The bracket of claim 1, further comprising an anti-slip layer, the anti-slip layer is defined on a surface of the first support rod or a surface of the second support rod.

3. The bracket of claim 1, wherein a third synchronization rod is connected between the third support rod and the fourth support rod, two ends of the third synchronization rod are rotatably connected to the third support rod and the fourth support rod, respectively.

4. The bracket of claim 3, wherein a fourth synchronization rod is connected between the third support rod and the fourth support rod, two ends of the fourth synchronization rod are rotatably connected to the third support rod and the fourth support rod, respectively.

5. The bracket of claim 4, wherein the third synchronization rod and the fourth synchronization rod are also rotatably coupled to each other, the intersection between the third synchronization rod and the fourth synchronization rod is in the middle of the third synchronization rod and is also in the middle of the fourth synchronization rod.

6. The bracket of claim 4, wherein a first alterable included angle is defined between the first support rod and the third support rod, the first alterable included angle is less than or equal to 90 degrees.

7. The bracket of claim 4, wherein a second alterable included angle is defined between the second support rod and the fourth support rod, and the second alterable included angle is less than or equal to 90 degrees.

8. The bracket of claim 4, wherein each of the first stopper clip and the second stopper clip is 6-shaped.

9. The bracket of claim 4, wherein each of the first stopper clip and the second stopper clip is a collapsible stopper clip.

10. The bracket of claim 1, wherein the first synchronization rod intersects the second synchronization rod to form X-shaped.

11. A bracket for a notebook computer or a tablet computer, comprising:

a first support rod comprising a first groove;
a second support rod comprising a second groove;
a third support rod defining a guide rail; and
a fourth support rod defining another guide rail;
wherein a front end of the first support rod is rotatably connected to the third support rod;
wherein a front end of the second support rod is rotatably connected to the fourth support rod;
wherein the first support rod is rotatably connected to a fifth support rod, one end of the fifth support rod is rotatably connected to the first groove of the first support rod, and the other end of the fifth support rod is rotatably connected to the guide rail of the third support rod;

wherein the second support rod is rotatably connected to a sixth support rod, one end of the sixth support rod is rotatably connected to the second groove of the second support rod, and the other end of the sixth support rod is rotatably connected to the guide rail of the fourth support rod;

wherein a first stopper clip is defined on the first support rod, or on the third support rod, or on a connecting shaft between the first support rod and the third support rod;

wherein a second stopper clip is defined on the second support rod, or on the fourth support rod, or on a connecting shaft between the second support rod and the fourth support rod;

wherein a first synchronization rod is connected between the first support rod and the second support rod, a second synchronization rod is connected between the first support rod and the second support rod;

wherein two ends of the first synchronization rod are rotatably connected to the first support rod and the second support rod, respectively;

wherein two ends of the second synchronization rod are rotatably connected to the first support rod and the second support rod, respectively; and wherein the first synchronization rod and the second synchronization rod are rotatably coupled to each other, the intersection between the first synchronization rod and the second synchronization rod is in the middle of the first synchronization rod and is also in the middle of the second synchronization rod.

12. The bracket of claim 11, further comprising an anti-slip layer, the anti-slip layer is defined on a surface of the first support rod or a surface of the second support rod.

13. The bracket of claim 12, wherein a third synchronization rod is connected between the third support rod and the fourth support rod, two ends of the third synchronization rod are rotatably connected to the third support rod and the fourth support rod, respectively.

14. The bracket of claim 13, wherein a fourth synchronization rod is connected between the third support rod and the fourth support rod, two ends of the fourth synchronization rod are rotatably connected to the third support rod and the fourth support rod, respectively.

15. The bracket of claim 14, wherein the third synchronization rod and the fourth synchronization rod are also rotatably coupled to each other, the intersection between the third synchronization rod and the fourth synchronization rod is in the middle of the third synchronization rod and is also in the middle of the fourth synchronization rod.

16. The bracket of claim 15, wherein a first alterable included angle is defined between the first support rod and the third support rod, the first alterable included angle is less than or equal to 90 degrees.

17. The bracket of claim 16, wherein a second alterable included angle is defined between the second support rod and the fourth support rod, the second alterable included angle is less than or equal to 90 degrees.

18. The bracket of claim 11, wherein a third synchronization rod is connected between the third synchronization rod and the fourth synchronization rod, two ends of the third synchronization rod are rotatably connected to the third support rod and the fourth support rod, respectively; a fourth synchronization rod is connected between the third synchronization rod and the fourth synchronization rod, two ends of the fourth synchronization rod are rotatably connected to the third support rod and the fourth support rod, respectively; and the third synchronization rod and the fourth synchronization rod are also rotatably coupled to each other.

19. The bracket of claim 18, wherein the each of the first stopper clip and the second stopper clip is 6-shaped.

20. The bracket of claim 18, wherein each of the first stopper clip and the second stopper clip is a collapsible stopper clip.

* * * * *